United States Patent [19]

Reneau

[11] 4,049,297
[45] Sept. 20, 1977

[54] PIPE COUPLING APPARATUS

[76] Inventor: Bobby J. Reneau, P.O. Box 14, Bellaire, Tex. 77401

[21] Appl. No.: 640,576

[22] Filed: Dec. 15, 1975

[51] Int. Cl.² .............................................. F16L 35/00
[52] U.S. Cl. ...................................... 285/24; 285/315; 285/322; 285/365; 285/369; 285/DIG. 21
[58] Field of Search .............. 285/18, 24, 27, DIG. 21, 285/369, 364, 365, 406, 407, 417, 420, 321, 304, 322, 311, 312, 315

[56] References Cited

U.S. PATENT DOCUMENTS

| 3,284,105 | 11/1966 | Leutwyler | 285/24 X |
| 3,383,122 | 5/1968 | Richardson | 285/365 X |
| 3,393,926 | 7/1968 | Arnold | 285/18 |
| 3,438,658 | 4/1969 | Stevens | 285/417 X |
| 3,628,812 | 12/1971 | Larralde | 285/24 |
| 3,907,338 | 9/1975 | Hayes et al. | 285/420 X |

FOREIGN PATENT DOCUMENTS 1,265,938  3/1972  United Kingdom .................. 285/24

Primary Examiner—Dave W. Arola
Attorney, Agent, or Firm—Donald Gunn

[57] ABSTRACT

A pipe coupling apparatus is disclosed. This apparatus is adapted for quick connection of two pipes without the use of flanges and the like. The apparatus is adapted for undersea connections and it may be used elsewhere. The present apparatus is comprised of an elongate housing enclosing two tapered sets of slips or collets. They work opposite a tapered surface in the housing. A circular piston is hydraulically pumped against the taper to force the collets against the pipe. This siezes and holds the pipe as a first step in completing the coupling. A second housing is adapted to be connected to the mating pipe. The second housing incorporates a circular piston therein which has an internal face which is tapered. The tapered face is driven past the exterior of an encircling clamp ring. The clamp has a cross section which is defined by a pair of inwardly protruding shoulders. These shoulders fall into grooves in the first and second housing, thereby pulling the two housings together when the clamp ring is squeezed. The two housings are thus pulled together and the pipes are formed into a completed axial connection whereby the first pipe is axially aligned with the second pipe.

9 Claims, 4 Drawing Figures

PIPE COUPLING APPARATUS

BACKGROUND OF THE INVENTION

In the connection of two pipes together, if there is adequate time and convenient access to the two pipes, they can be joined by means of welding or bolting flange plates together. This convenience is not always readily available. A rapid high speed connection is difficult to achieve. Moreover, it is often difficult to achieve in a difficult working climate. Difficulty can be encountered at a number of locations such as undersea location, in a deep ditch, in swampy areas where the tide periodically submerges everything, and so on. The coupling device for the present invention is a coupling which provides a perfect metal to metal seal whereby first and second pipes are connected together. The connection is thus easily installed and holds indefinitely.

The present coupling grabs one pipe and holds it secure while the other pipe is connected to or attached to a housing which has an internal pipe segment of equal diameter to the pipe line. Thus, the short pipe segment is attached to one of the two pipes to be connected in a leisurely fashion. This can be done weeks ahead of time. A second housing is incorporated. It slips over the end of the remaining pipe. This can be done rather rapidly. Once this has been accomplished, the two pipes can then be joined together by axial allignment of the two housings, and thereafter applying hydraulic pressure the two are firmly clamped.

SUMMARY OF THE INVENTION

This invention is summarized as a connector for joining two pipe sections together. The connector has a first and second housing which are adapted to join to one another. The first housing merely slips over the end of one of the pipes. The second housing includes an internal pipe segment equal to the diameter of the pipe to be joined. It is attached to the other pipe conveniently by means of welding or the like. When the two housings are brought together they are joined as by bolts. In the telescoping housing, the pipe alignment clamps are incorporated. They are hydraulically operated. They center one pipe for connection into the other housing. A pair of encircling shouledrs are seized and pulled together by means of a lock ring. The lock ring has a pair of internal protruding shoulders with tapered edges. When it is squeezed radially inwardly, it grabs the shoulders and pulls them together. The lock ring itself is forced inwardly by means of a piston in a cylinder which is forced axially of the second housing, the piston incorporating an encircling skirt having a tapered surface. Means are included which lock the piston in the position achieved.

DESCRIPTION OF THE PREFERRED EMBODIMENT

Figure 1:
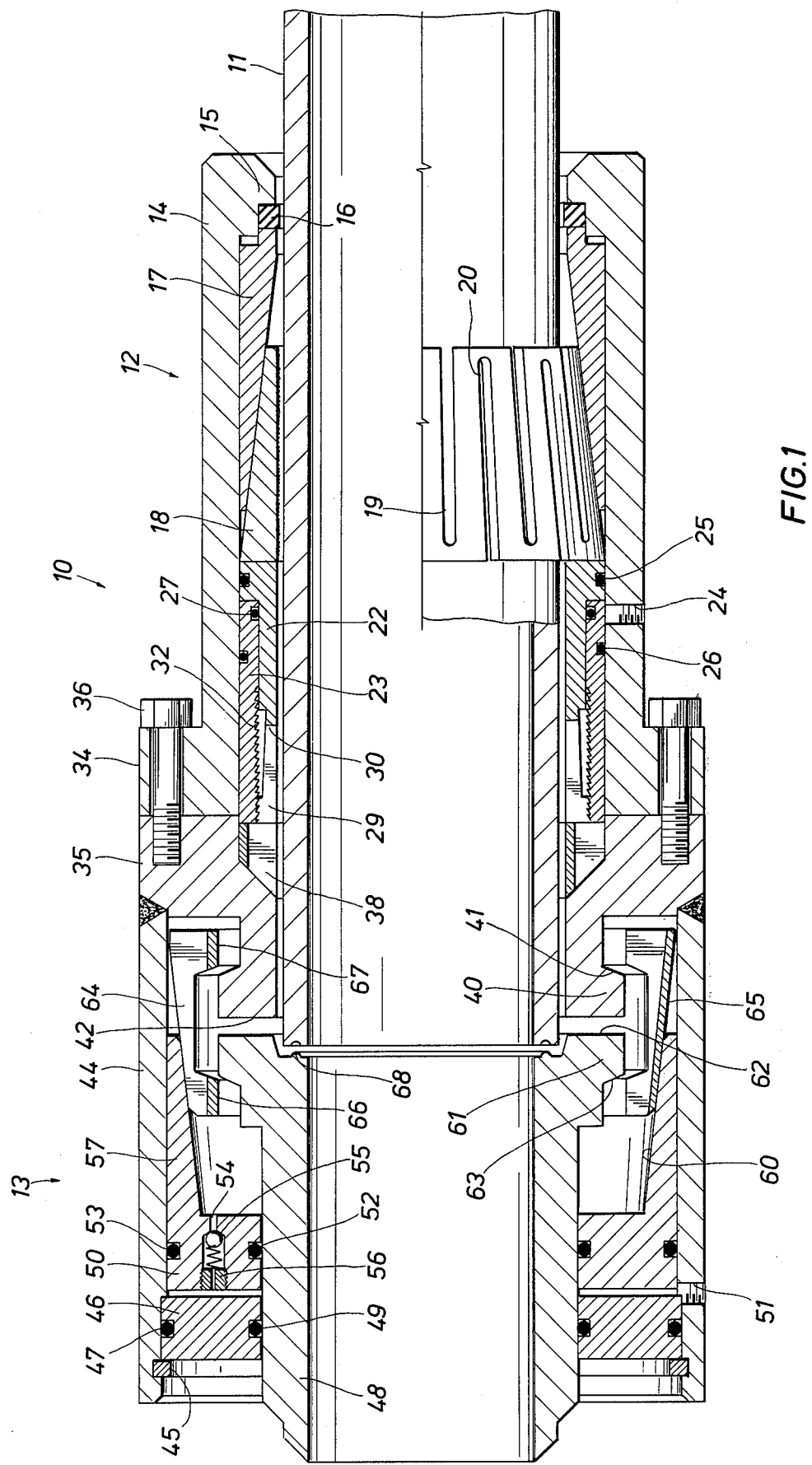
FIG. 1 is a sectional view through the prefered embodiment of the present invention illustrating details of construction of means for grasping one pipe and means for forcing the two pipe housings together to complete the seal.
Figure 2:
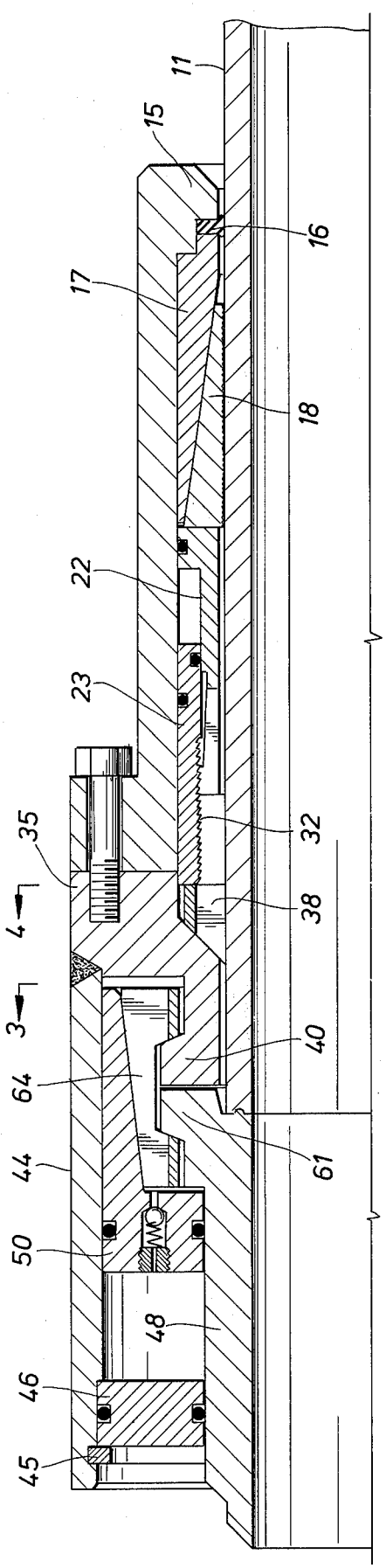
FIG. 2 is a sectional view of the apparatus shown in FIG. 1 after the application of hydraulic pressure which shows the components in altered positions after the pipe has been seized.
Figure 4:
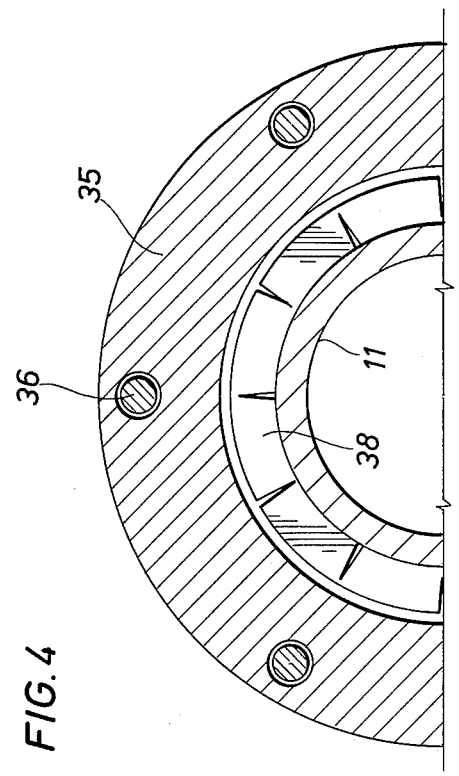
FIG. 4 is a sectional view along the line of 4—4 of FIG. 2.
Figure 3:
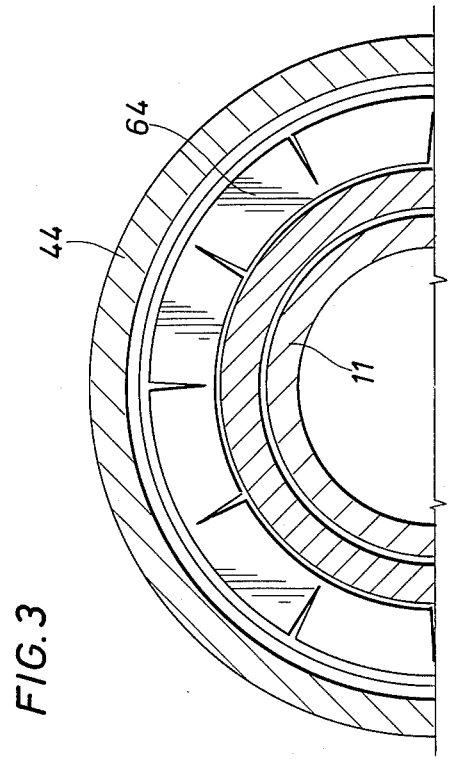
FIG. 3 is a sectional view along the line 3—3 of FIG. 2.

In FIG. 1, the pipe coupling of the present invention is identified with the numeral 10. It is intended to connect a first pipe 11 and a second pipe, not shown, which typically has the same diameter and which is welded to the end opposite the pipe 10. The apparatus includes a first housing 12. A second housing 12 is included and will be described later. The housing 12 is formed of a tubular cylindrical body 14. It has an inwardly directed shoulder 15. The Shoulder 15 clears the pipe 11 and need not be snuggly fitted thereabout. It supports a water stop 16. This is a seal which is abutted against the shoulder and which is subsequently expanded to keep out water in the event the coupling 10 is used underwater. The water stop 16 is adjacent to a slideably positioned tapered body 17. The tapered body 17 has a cylindrical outer surface and it is slidably positioned in the tubular member 14. As shown in FIG. 1, it is shaped at the right hand end to enable it to slide and compress the water stop 16 as shown in FIG. 2. The equipment is shown in the relaxed position in FIG. 1.

The tapered body 17 in particular is of interest because it includes an internal surface which is tapered, and which is in contact with the outer face of the tapered set of collets 18. The member 18 functions as a collet. The collet 18 is of single piece construction. In its relaxed state, it is substantially larger than the pipe 11 and is able to clear the pipe. The collet 18 is cut from one end or the other as identified by the lengthwise cuts 19 and 20 in FIG. 1. The several cuts are interleaved. They remove a sufficient mass of metal to enable the collet 18 to shrink. Several such cuts are included in the collet 18. They accomodate shrinkage of the collet when it is forced to the right of FIG. 1 against the tapered member 17. When this occurs, the collet is forced radially inwardly and grabs the pipe 11 and holds it securely. When held, the pipe 11 is centered in the housing.

The tubular housing 14 further incloses a first piston 22 and a second piston 23. The pistons 22 and 23 are concentrically arranged with one another and telescopic over one another. The housing 14 has a threaded and tapped opening 24 where hydraulic fluid is introduced between the two pistons. To assure that the hydraulic fluid flows to the desired location, the apparatus includes an O-ring seal 25 on the first piston. The second piston has a similar o-ring seal 26. The o-ring seals prevent leakage of pressure fluid along the interior wall of the housing 14.

A third seal at 27 prevents leakage between the two pistons. The passage 24 introduces pressure fluid into the circular cavity or opening between the two pistons. The pressure fluid forces the two pistons apart.

The first piston includes a set of finger 29 at a left hand end. The fingers 29 are separated from one another. The fingers 29 are defined by a set of cuts at 30. In other words, considering the entire circumference of the circular piston 22, about one-third to two-thirds of the metal is cut away to the left of the line 30 in defining the fingers 29 which flex inwardly.

The fingers 29 include a buttress thread on their exposed surface. The buttress thread mates with the thread 32 on the interior of the second piston 23. The first and second pistons can be threaded together by hand. The threads are cut such that ratcheting movement of the pistons away from one another is permitted. The fingers 29 ride over the top of the threads. Ratcheting movement to the left is not permitted. The fingers 29 and the ratchet threads 32 serve as a locking mechanism. When the two pistons move apart they are then locked apart.

The cylindrical body 14 has a flange 34 at one end which abuts against a flange 35. The two are joined together by bolts 36. If desired, a seal such as a gasket or an o-ring can be placed between them. The flange 35 is counterbored, defining an internal axial cavity. The axial cavity receives a short tapered collet 38. The collet 38 is similar to the collet 18 except that it is substantially shorter. It is additionally cut with interleaved radially directed cuts. The cuts 19 and 20 in the collet 18 extend from the ends of the member. The collet 38 however, has radial cuts which extend from the inner and outer surface of the collet. It is for this reason that the sectional view of FIG. 1 shows only a thin web of material remaining in the collet 38.

The flanged body 35 is observed in FIG. 1 to include a tapered face confronting the collet 38. The tapered collet is relatively short. It is not necessary that it grab firmly the pipe 11 and hold it securely. It serves more as a centering collet. When the pistons 22 and 23 are forced apart, the collet 38 is forced radially inwardly in the same manner as the collet 18. The collet 18 has a substantial face confronting the pipe 11. The collet 18 can be provided with serrations on its internal face. The collet 38 does not require serrations in ordinary use.

The flanged body 35 is axially positioned about the pipe 11. It has a shoulder portion 40 which extends fully around the body and is concentric about the pipe 11. The shoulder portion 40 in particular is defined by a tapered external face 41. The opposing face 42 is transversely arranged.

The second housing 13 includes a tubular external sleeve 44. The sleeve 44 is open at the left hand end. It has an internal groove to receive a snap ring 45. The snap ring 45 locks in position to capture a circular head 46. The head 46 is in a form of a ring. A seal ring 47 prevents leakage past the head 46. It will be observed that the head is locked into position by the snap ring 45 and an abutting shoulder on the opposite side.

The numeral 48 identifies a short pipe segment. Preferably, it has the same internal diameter as the pipe 11. It has an exposed left hand end which is readily welded to the pipe line. The pipe segment 48 is fairly short. It has an external surface which fits within the head 46. Leakage past the head is prevented by an o ring seal 49. The head additionally centers the pipe segment 48 in the tubular housing 44. On the right hand side of the head 46, a cylindrical cavity is defined. A piston 50 is located in this cavity. The piston 50 is slideable between the pipe segment 48 and the tubular housing 44. It is movable to the right as viewed in FIG. 1, motion to the left being limited to the head. The tubular housing is drilled with a tapped hole 51 to introduce fluid under pressure into the space between the head 46 and the piston 50.

As will be observed, the piston 50 is a ring like structure. It fits on the exterior of a pipe segment 48 and leakage therepast is prevented by an o-ring seal 52. A similar o-ring seal 53 is located on the exterior of the piston 50. The piston 50 is drilled with a small hole 54. The hole is then enlarged to define a valve seat and a spherical valve element 55 is positioned against the seat. A spring forces the valve element against the seat. The spring is captured in the enlarged drilled passage by a perforated threaded plug 56. This defines a leakage pass through the system. It does not leak pressure fluid introduced through the opening 51. The piston has appended to it an elongate skirt portion 57. The skirt has an exposed internal tapered face 60. The skirt extends parallel to the tubular housing 44 on its exterior. More will be noted concerning the face 60.

The pipe segment 48 terminates at its right hand end at an enlarged shoulder 61. The shoulder 61 has a flush transverse face 62 which almost abuts against the face 42 of the shoulder 40. Additionally a tapered face 63 on the shoulder 61, is defined. The tapered face 63 is similar to the tapered face 41 previously mentioned.

A lock ring 64 encircles the shoulder 40 and 61. The lock ring 64 fully encircles both of them. The lock ring is cut with interleaved radially directed cuts as shown in FIG. 2. This reduces the metal in the lock ring and enables it to shrink radially. The lock ring 64 has a tapered external surface 65 which contacts the tapered internal surface 60 of the piston. The tapered face 65 tapers preferably at the same angle. The lock ring 64 has a pair of inwardly directed shoulders, one at each end. These shoulders in a relaxed condition are sufficiently large to clear the shoulders 40 and 61. This enables the lock ring 64 to be passed around them. This is shown in FIG. 1 which is the relaxed position of the equipment. The lock ring thus has a first shoulder 66 and a second shoulder 67. These are located adjacent to the tapered surfaces 63 and 41 of the shoulders 61 and 40, When the lock ring 64 is squeezed radially inwardly, it shrinks and the shoulders 66 and 67 are seated against the tapered shoulders 63 and 41 respectively. This squeezes the shoulders 40 and 61 toward one another, pulling the two housing together. When this occurs, the transverse faces 42 and 62 are butted against one another. This jams the short pipe segment 48 against the pipe 11. This forms a metal to metal seal. This seal is enhanced by incorporation of a bead 68 formed in the short pipe segment 48. The bead is preferably a harder material than the pipe 11 and creases the facing shoulder of the pipe 11 to form a mating groove around the arrangement which seals quite nicely.

Attention is directed to FIG. 2 of the drawings. When hydraulic fluid is introduced between the pistons 22 and 23 they are forced apart. After the hydraulic fluid pressure drops, they are continuously held apart by the fingers 29 which engage the threaded surface 32. This functions as a ratchet mechanism preventing return of the eqipment. The tapered collet 18 is thus forced and held to the right. It also forces the tapered insert 17 to the right which compresses the water stop 16. The collet 18 is forced radially inwardly to grip the pipe. The shorter collet 38 is forced radially inwardly to center the pipe.

Hydraulic fluid is introduced through the opening 51 between the head 46 and the piston 50. This forces the piston to the right. When it moves to the right the tapered surface 60 passes over the lock ring and squeezes it radially inwardly. When it is squeezed inwardly, it engages the shoulders 40 and 61. Because of the sloping surfaces between the lock ring and the shoulders 40 and 61, they are pulled into facial contact. When the shoulders abut one another, the pipe segment 48 is pulled laterally into contact with the but end of the pipe 11. At this time, a metal to metal seal preventing leakage from the pipe 11 is achieved.

In the event the seal is not perfect, leakage to the right is prevented by the water stop 16. Leakage to the left of the end of the pipe 11 is limited by the piston 50. The pressure relief passage 54 fills the space between the piston and the head. However, the passage 51 is preferably sealed with a plug or needle valve. Thus, any leakage past the joint pipe 11 is eventually acccumulated in the chamber between the head and the piston 50 introduced through the check valve. As the chamber comes up to a pressure level approaching the pipeline level it serves as a lock against the piston 50, thereby preventing a subsequent movement to the left as viewed in FIG. 2. This is a self actuating pressure lock mechanism taking advantage of any leakage which might occur.

The foregoing is directed to the preferred embodiment but the scope is determined by the claims which follow.

I claim:

1. For use in connecting a first pipe to a second pipe, a coupling apparatus which comprises:
   an elongated cylindrical housing adapted to telescope over the end of a first pipe;
   pipe clamping means carried in said housing for clamping and holding the end of the first pipe;
   a second housing enclosing a pipe segment adapted to be joined to a second pipe which is to be connected to the first pipe;
   means for axially aligning said first and second housings with one another;
   an encircling shoulder fixedly connected to said first housing;
   a parallel encircling shoulder fixedly attached to said second housing;
   lock means for grasping said shoulders and pulling said shoulders toward one another, said lock means drawing the end of the first pipe against the pipe segment to axially communicate them;
   said lock means including;
   a collet means for clamping the pipe, said collet means centering the pipe at a specified location;
   a seal means around the pipe sealing the pipe against leakage along said first housing;
   a facing and mating surface on the pipe segment for abutting and joining the pipe segment to the first pipe; and
   means for actuating said collet means.

2. The apparatus of claim 1 wherein said actuating means includes a pair of pistons within said housing, said pistons being positioned to move away from one another when a pressure fluid is introduced between them.

3. For use in connecting a first pipe to a second pipe, a coupling apparatus which comprises:
   an elongated cylindrical housing adapted to telescope over the end of a first pipe;
   pipe clamping means carried in said housing for clamping and holding the end of the first pipe;
   a second housing enclosing a pipe segment adapted to be joined to a second pipe which is to be connected to the first pipe;
   means for axially aligning said first and second housings with one another;
   an encircling shoulder fixedly connected to said first housing;
   a parallel encircling shoulder fixedly attached to said second housing;
   lock means for grasping said shoulders and pulling said shoulders toward one another, said lock means drawing the end of the first pipe against the pipe segment to axially communicate them;
   said lock means including:
   an encircling ring-like member;
   a tapered concentric surface adjacent to and surrounding said ring-like member, said surface confining and moving said ring-like member radially inwardly when said surface moves axially thereof; and
   a pair of diverging inwardly directed shoulders on said ring-like member sized and angled to force said encircling shoulders toward one another axially on radially inward movement of said ring-like member.

4. The apparatus of claim 3 wherein said ringlike member is enabled for radial inward movement by including a plurality of cuts therein along radial lines.

5. The apparatus of claim 3 wherein said ringlike member is forced along the length of said tapered surface by a ring shaped piston exposed to a fluid under pressure in a ring shaped closed cylinder.

6. The apparatus of claim 5 wherein said tapered surface has the form of a tapered skirt appended to said piston and said piston and skirt are jointly received in an internally hollow cylinder within one of said housings.

7. For use in connecting a first pipe to a second pipe, a coupling apparatus which comprises:
   an elongated cylindrical housing adapted to telescope over the end of a first pipe;
   pipe clamping means carried in said housing for clamping and holding the end of the first pipe;
   a second housing enclosing a pipe segment adapted to be joined to a second pipe which is to be connected to the first pipe;
   means for axially aligning said first and second housings with one another;
   an encircling shoulder fixedly connected to said first housing;
   a parallel encircling shoulder fixedly attached to said second housing;
   lock means for grasping said shoulders and pulling said shoulders toward one another, said lock means drawing the end of the first pipe against the pipe segment to axially communicate them; and
   a seal for one of the pipes which seal surrounds said pipe and is adjacent to a shoulder on the interior of one of said housings and is squeezed into sealing contact with the pipe by a slidable sleeve butted against said seal.

8. For use in connecting a first pipe to a second pipe, a coupling apparatus which comprises:
   an elongated cylindrical housing adapted to telescope over the end of a first pipe;
   pipe clamping means carried in said housing for clamping and holding the end of the first pipe;
   a second housing enclosing a pipe segment adapted to be joined to a second pipe which is to be connected to the first pipe;
   means for axially aligning said first and second housings with one another;
   an encircling shoulder fixedly connected to said first housing;
   a parallel encircling shoulder fixedly attached to said second housing;
   lock means for grasping said shoulders and pulling said shoulders toward one another, said lock means drawing the end of the first pipe against the pipe segment to axially communicate them; and wherein said shoulders are angularly inclined and encircle the pipes therein, said shoulders including parallel faces contacting one another when said lock means grasp said shoulders on said angled faces.

9. The apparatus of claim 8 wherein said shoulders are within said housings.

* * * * *